United States Patent Office 3,698,918
Patented Oct. 17, 1972

3,698,918
MANUFACTURE OF CHEESE CURD

Marie Pierre Goujard, Neuilly-sur-Seine, France, assignor to Compagnie Gervais Danone, Levallois-Perret, France
Continuation-in-part of application Ser. No. 86,616, Nov. 3, 1970, which is a continuation of abandoned application Ser. No. 619,272, Feb. 28, 1967, and a continuation-in-part of abandoned application Ser. No. 803,432, Feb. 28, 1969. This application Feb. 26, 1971, Ser. No. 119,338
Int. Cl. A23c 19/02
U.S. Cl. 99—116                    9 Claims

ABSTRACT OF THE DISCLOSURE

The present invention relates to a proces for the manufacture of milk curd by mixing previously acidified lactic whey with concentrated milk, the acidity of the whey being between 0.5 and 2.5 and the pH of said mixture being between about 3 to about 5, the proportions of dry extract of said milk and the conditions of separation of said curd are so selected as to recover substantially as much of the whey as was used to produce curdling of the milk.

---

Figure 1:
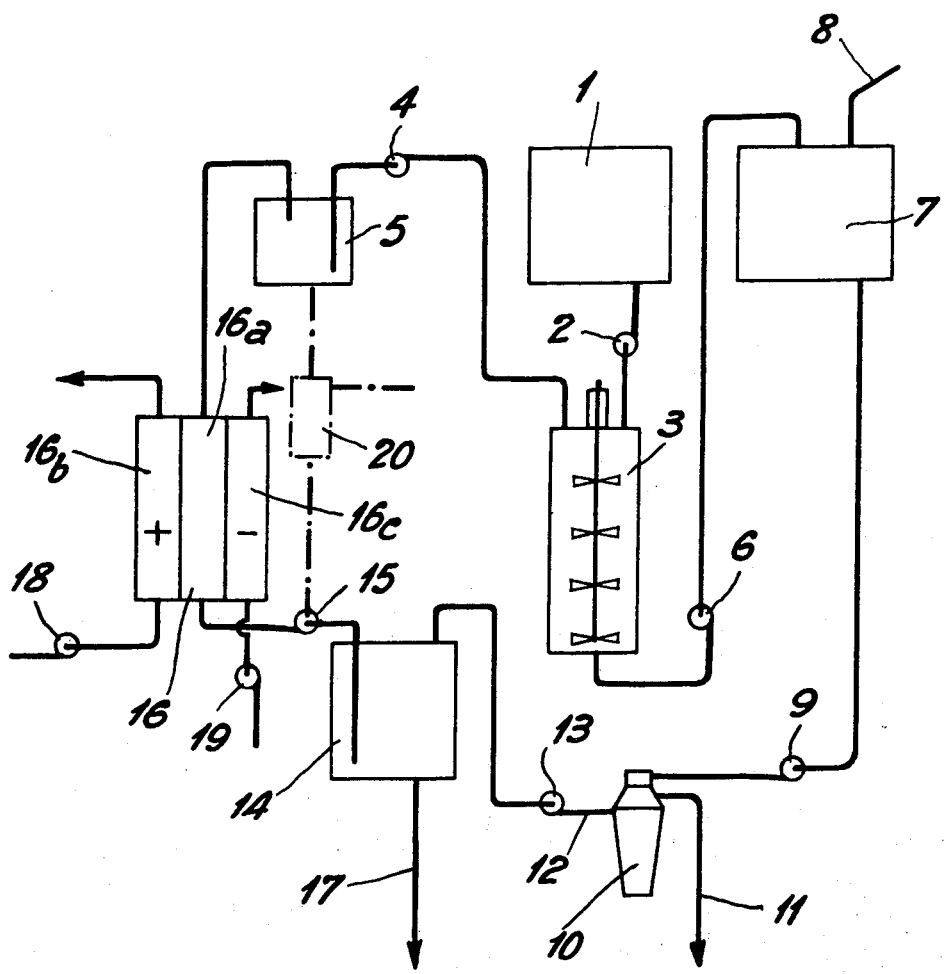

This application is a continuation-in-part of my copending application Ser. No. 86,616, filed Nov. 3, 1970, which is a streamlined continuation of application Ser. No. 619,272, dated Feb. 28, 1967, now abandoned, and my copending application Ser. No. 803,432, filed Feb. 28, 1969, now abandoned.

BACKGROUND

It is known that at present, generally speaking, curds in the cheese trade are made by composite processes utilizing the action of rennet and that of lactic ferments. Such processes are not readily adaptable to continuous operation and they are nothing more than the development on a large scale of an ancient and empirical technique.

With the object of attempting to mechanize the technical process of manufacturing cheeses it has already been proposed (M. E. Choubine—Dokl. nauchn. Monf. Vopr. Teckhn. Mikrobiol. Mol. molat. Prod, Vologda—1964, pp. 23–28) to pre-acidify milk by a lactic fermentation and then to collect a serum which one continues to acidify by fermentation.

The serum acidified in this way is then used to treat milk which has been previously and moderately acidified by fermentation, so as to bring the acidity of the mixture to the value sufficient to obtain coagulation of the curd. This coagulation furnishes, after separation of the curd, a serum which can be fermented in its turn, like the initial serum, in order to acidify it and which may be used for continuing the operation.

This process has numerous disadvantages among which may be mentioned its slow character; several hours are necessary in order to obtain the coagulation and at least one day in order to acidify the serum. In addition the process is uncertain, owing to the fact that the acidification results from a biological process. In effect the ferment stocks do not operate in a perfectly constant manner and the final acidity of the serum cannot be readily fixed at a determined value.

In addition the ferment stocks permitting the acidification of the serum rapidly become exhausted and, at any rate, the degree of acidification is limited, the concentration in active cells of the ferments decreasing in proportion to the progress of the said acidification.

The process moreover has the inconvenience of necessitating a heating in order to obtain the best yield which in spite of everything remains mediocre.

It should be mentioned finally that one of the main characteristics of the above-mentioned process is a too extensive transformation of the lactose into lactic acid which confers the desired acidity on the serum; this strong degradation of the lactose is prejudicial to the quality of the product obtained.

THE PROCESS OF APPLICATION SER. NO. 619,272

This process has for its object the manufacture of milk curd which is capable of being performed continuously and which also uses a mixture of milk with an acidified serum, but which permits rapid operation, enables well-defined conditions to be reproduced easily, and above all results in an excellent yield of a product of very good quality.

According to this process for manufacturing milk curd by mixing milk with an acidified serum derived from a previous curdling operation, the acidification of the serum is performed by means which do not cause degradation of the lactose.

Such means may be chemical, and include the addition to the serum of a suitable mineral or organic acid.

The means may also be physio-chemical, the acidification of the serum then being obtained by electrodialysis.

Advantageously the acidification of the serum is continued until the pH of the serum falls to a value of about 0.5 to 2.5, and preferably from 0.9 to 2, these conditions being variable according to the nature of the acidification used.

The serum is then mixed with the milk so as to bring the pH of the mixture to a value between about 3 and 5. It has been observed in fact that at a pH above 5.2 the curdling no longer takes place, and that for at pH values lower than 2.8 the curdling results in very fine particles which are difficult to separate from the serum.

The figures which have just been indicated correspond to an addition to the milk of about 60 to 20% of serum by volume.

The operation is best performed at ambient temperature.

When the acidification is performed by chemical means, mineral acids may be employed, preferably acids such as hydrochloric acid and orthophosphoric acid, with which there is no risk of harming the quality of the product. However, other acids may be employed provided that suitable precautions are taken.

Among the organic acids, there may be used acetic acid, citric acid and, preferably, lactic acid, the choice of these acids being determined by their dissociation constants, their organoleptic character and especially their non-toxic character.

So far as the carrying out of the process by electrodialysis is concerned, it may be carried out in any device of known type which directs the electrodialysis towards an acidification of the serum.

Preferably, the initial serum is prepared by an acidifying electrodialysis of milk and separation of the curd obtained. Later, the process may be carried out continuously by acidifying a part of the serum collected after separation of the curd and mixing it with fresh milk.

When the process is carried out by electrodialysis, it is preferable to use selective anionic and cationic membranes and to dispose these membranes judiciously so as to achieve acidification of the serum without impoverishment of cations.

According to a particularly advantageous embodiment, the serum to be acidified is placed between two selective membranes of opposite signs disposed so as to retain the ions in the serum, the acidification resulting from the combination of hydrogen ions and the anions yielded by the solutions adjacent to the membranes. The solution generating the hydrogen ions is an acid solution, preferably a strong acid.

As the source of anions, preferably there is used a solution of the same nature as the serum to be acidified, with the object of not introducing foreign substances.

This solution is advantageously constituted by a milk product, preferably surplus serum derived from a previous curdling operation.

Figure 2:
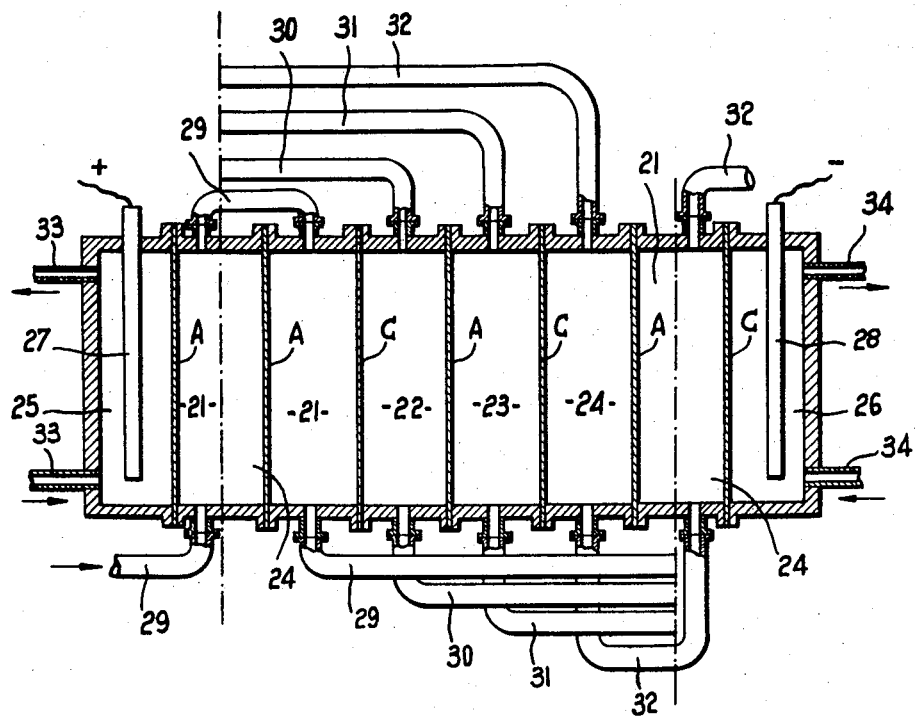

This process will now be described in greater detail, by way of example, with reference to the accompanying drawings, in which FIG. 1 is a flow diagram of apparatus for carrying out this process, and FIG. 2 is a partial schematic view, partly in section, of an apparatus for carrying out this process, which apparatus comprises selective membranes.

In the embodiment shown in FIG. 1, the milk which may be whole milk or skimmed milk and in which lactic ferments may also have been incorporated, for example by direct introduction of the latter or by addition of a milk product such as cream, so as to confer on the curd the organoleptic properties peculiar to these ferments, is delivered, from a reservoir 1 by means of a pump 2, into a mixer 3 into which is also introduced, by means of a pump 4, acidified serum coming from a reservoir 5.

The mixture of milk and serum is delivered, by a pump 6, into a vat 7 at which may terminate a pipe 8 enabling, if necessary, the incorporation into the mixture of ferments such as mentioned above, if such ferments are desired and if they have not been incorporated initially in the milk.

From the vat 7, the mixture is delivered by a pump 9 to a centrifugal separator 10 where the curd is collected at 11.

The serum leaves the separator via a pipe 12, and it is taken up by a pump 13 which delivers it into an intermediate reservoir 14.

A part of the serum in the reservoir 14 is delivered by a pump 15 into an electrodialyser 16 and the remainder is evacuated via a pipe 17.

The electrodialyser 16 has been shown very schematically, by way of example, as comprising a central portion 16a through which the serum passes and lateral anodic and cathodic compartments 16b and 16c, respectively. Obviously more sophisticated apparatus may be used of any appropriate type.

The anodic compartment is fed by means of a pump 18 and the cathodic compartment by means of a pump 19. The feed takes place by means of water or solutions of suitable electrolytes.

From the electrodialyser, the serum, suitably acidified, is delivered into the reservoir 5 for use in initiating the process, as has been described.

If the operation is not carried out by electrodialysis but by chemical acidification of the serum, the essential items of the apparatus described above are retained; it suffices to interpose between the pump 15 and the reservoir 5 a mixer 20 (shown in dotted lines) in place of the electrodialyser, which mixer serves to add the desired quantity of said to the recycled serum.

It will thus be seen that this process lends itself to continuous operation without the hazards associated with curdling by means of rennet or by fermentation.

The acidities both of the serum as well as of the serum-milk mixture may be easily controlled and reproduced.

The weak pH value of the acidified serum ensures that the latter is not subject to any fermentative process.

As regards the curd, it is produced with a very fine, non-granular structure and it possesses better keeping qualities than those of curds obtained by the known processes.

In addition, and this is very important, the curd is obtained in yields hitherto unknown in the cheese-making industry and which may be 50% better than those of the known processes.

This may be explained by the fact that the serum, according to this process, is strongly retained by the molecular products formed at the time of curdling.

It is thus possible to obtain yields of curd of about 350 to 600 g. per liter of milk treated with more than 100 g. of dry substance. These yields depend, to a certain extent, on the conditions of the centrifuging. Accelerations of from 250 to 1000 g. and centrifuging times of from 1 to 10 minutes give excellent results. The quality of the products obtained is also better than that given by the known processes.

Another advantage of the process is that it decreases the quantities of serum to be evacuated composed with the known processes.

This process will now be further described in the ensuing, non-limitative examples:

EXAMPLE 1

Curdling of milk by a serum acidified by acid electrodialysis

One liter of a serum derived from a milk curdling operation carried out as described below, and possessing the following characteristics:

| | | |
|---|---|---|
| Dry extract | percent | 5.7 |
| Fatty materials | do | [1] 0.5 |
| pH | | 4.2 |
| Acidity | ° Dornic (D.) | 38 |
| Lactose content | g./l | 50 |

[1] With respect to the dry extract.

is acidified by electrodialysis in order to give a serum having the following new characteristics:

| | | |
|---|---|---|
| Dry extract | percent | 5.4 |
| Fatty materials | do | [1] 0.5 |
| pH | | 1.7 |
| Acidity | °D | 83 |
| Lactose content | g./l | 49 |

[1] With respect to the dry extract.

One liter of whole milk is added to this serum, in small fractions of equal volume, with stirring, this milk having the following principal characteristics:

| | | |
|---|---|---|
| Dry extract | percent | 13.2 |
| Fatty materials | do | [1] 30.3 |
| pH | | 6.5 |
| Acidity | ° D | 14.5 |
| Lactose content | g./l | 48.5 |

[1] With respect to the dry extract.

The resulting mixture then has a pH of 4.05 and an acidity of 39° D.

This mixture is centrifuged at an acceleration of 750 g. for 3 minutes, and is separated into a curd and a new serum.

There is obtained 454 g. of curd possessing the following characteristics:

| | Percent |
|---|---|
| Dry extract | 19.7 |
| Fatty materials | [1] 43 |
| Lactose content | [1] 24 |

[1] With respect to the dry extract.

In addition there is recovered 1,560 liters if a new serum having the following characteristics:

| | | |
|---|---|---|
| Dry extract | percent | 5.4 |
| Fatty materials | do | [1] 0.5 |
| pH | | 4.05 |
| Acidity | ° D | 39 |
| Lactose content | g./l | 50 |

[1] With respect to the dry extract.

which characteristics are very near to those of the initial serum.

EXAMPLE 2

The curdling of milk by a serum acidified with hydrochloric acid

One liter of serum, derived from a milk curdling operation carried out as described below and possessing the following characteristics:

| | | |
|---|---|---|
| Dry extract | percent | 7.3 |
| Fatty materials | do | 0 |
| pH | | 4 |
| Acidity | °D | 44 |
| Lactose content | g./l | 50.5 | is acidified by the addition of 6 ml. of concentrated hydrochloric acid.

The characteristics of the serum thus obtained are as follows:

| | | |
|---|---|---|
| Dry extract | percent | 7.5 |
| Fatty materials | do | 0 |
| pH | | 1.70 |
| Acidity | °D | 105 |
| Lactose content | g./l | 50 |

This serum is added to 1 liter of whole milk, in small fractions of equal volume, with stirring.

The principal characteristics of the milk are:

| | | |
|---|---|---|
| Dry extract | percent | 12.4 |
| Fatty materials | do | [1] 33 |
| pH | | 6.65 |
| Acidity | °D | 15.5 |
| Lactose content | g./l | 49 |

[1] With respect to the dry extract.

The pH of the resulting mixture is equal to 3.90 and the acidity is 61° D.

After centrifuging this mixture for 3 minutes with an acceleration of 750 g., there is collected:

(a) 540 g. of curd having the following characteristics:

| | Percent |
|---|---|
| Dry extract | 18.3 |
| Fatty materials | [1] 40.5 |
| Lactose content | [1] 25 |

[1] With respect to the dry extract.

(b) 1.480 liters of a serum having the following characteristics:

| | | |
|---|---|---|
| Dry extract | Percent | 7.15 |
| Fatty materials | do | 0 |
| pH | | 3.90 |
| Acidity | °D | 50.5 |
| Lactose content | g./l | 50 |

EXAMPLE 3

The curdling of milk by a serum acidified with lactic acid

One liter of serum, derived from a milk curdling operation carried out as described below, and possessing the following characteristics:

| | | |
|---|---|---|
| Dry extract | Percent | 7.1 |
| Fatty materials | do | [1] 0.6 |
| pH | | 4.50 |
| Acidity | °D | 40.5 |
| Lactose content | g./l | 49.5 |

[1] With respect to the dry extract.

is acidified by the addition of 7 ml. of lactic acid (of a specific gravity 1.21).

This acidified serum has the following characteristics:

| | | |
|---|---|---|
| Dry extract | Percent | 7.7 |
| Fatty materials | do | [1] 0.6 |
| pH | | 3.50 |
| Acidity | °D | 102 |
| Lactose content | g./l | 49 |

[1] With respect to the dry extract.

This serum is added to 1 liter of whole milk in small fractions of equal volume, with stirring.

The principal characteristics of the milk are:

| | | |
|---|---|---|
| Dry extract | Percent | 12.4 |
| Fatty materials | do | [1] 33 |
| pH | | 6.65 |
| Acidity | °D | 15.5 |
| Lactose content | g./l | 49 |

[1] With respect to the dry extract.

The resulting mixture has a pH of 4.45 and an acidity of 59.5° D.

After centrifuging the mixture for 3 minutes at an acceleration of 750 g., there is obtained:

(a) 488 g. of a curd having the following characteristics:

| | Percent |
|---|---|
| Dry extract | 18.75 |
| Fatty materials | [1] 43.5 |
| Lactose content | [1] 24 |

[1] With respect to the dry extract.

(b) 1.520 liters of a serum having the following characteristics:

| | | |
|---|---|---|
| Dry extract | Percent | 7.7 |
| Fatty materials | do | [1] 1 |
| pH | | 4.05 |
| Acidity | °D | 49.5 |
| Lactose content | g./l | 49.5 |

[1] With respect to the dry extract.

In the example shown in FIG. 2, the electrodialysis apparatus is formed by a series of elementary cells with four compartments defined by alternate anionic and cationic membranes A, C, and by two end anodic and cathodic compartments 25, 26 containing, respectively, an anode 27 and a cathode 28. Each of the cells includes a compartment 21 through which an acid solution circulates, for example, hydrochloric or sulphuric acid at concentrations of the order of 0.05 N to 0.2 N, a compartment 22 through which the serum to be acidified circulates, a compartment 23 containing the serum donating the anions and a water compartment 24 for the removal of the secondary ionic species. The compartments 21 are served by pipes 29, the compartments 22 by pipes 30, the compartments 23 by pipes 31 and the compartments 24 by pipes 32.

In the end compartments water may be circulated at suitable flow rates by means of pipes 33, 34.

In use, the cationic membrane separating the serum from the acid solution prevents anions from leaving the serum but allows the passage of protons coming from the acid compartment; the anionic membrane separating the serum to be acidified from the serum donating the anions retains the cations in the first, but allows passage of anions from the donor serum toward the treated serum. There is thus produced a progressive acidification of the serum resulting in an increase in anions and in protons and not in an ionic substitution.

By suitably controlling the different variable factors of the electrodialysis, and in particular by controlling the nature, the concentration and the renewal of the liquids feeding the compartments other than those which contain the serum to be acidified—namely the anodic solution, the acid solution, the second serum, the aqueous solution evacuating the salts formed, and the cathodic solution—the acidification of the serum can be carried out under good conditions.

This acidification is continued up to a pH value of from 0.5 and 3, preferably in the region of 1.85.

The acidified serum is mixed milk in suitable proportions in the manner previously described; the centrifuging of this mixture permits the separation of a curd and a serum of which a part is returned to the electrodialyser.

The following non-limitative example illustrates this process:

EXAMPLE 4

One liter of serum derived from a milk curdling operation carried out as described below and possessing the following characteristics:

| | | |
|---|---|---|
| Dry extract | percent | 6.4 |
| Fatty materials | do | 0 |
| pH | | 4.40 |
| Acidity | °D | 39.5 |
| Calcium content | g./l | 0.96 |
| Lactose content | g./l | 51.5 | is acidified by electrodialysis as described above, to give a serum having the following new characteristics:

| | | |
|---|---|---|
| Dry extract | percent | 6.7 |
| Fatty materials | do | 0 |
| pH | | 1.90 |
| Acidity | °D | 125 |
| Calcium content | g./l | 0.96 |
| Lactose content | g./l | 51.5 |

This serum is added, in small fractions of equal volume, while stirring, to 1 liter of whole milk having the following characteristics:

| | | |
|---|---|---|
| Dry extract | percent | 13.4 |
| Fatty materials | do | [1] 27.4 |
| pH | | 6.75 |
| Acidity | °D | 15.7 |
| Calcium content | g./l | 1.30 |
| Lactose content | g./l | 52 |

[1] With respect to the dry extract.

The resulting mixture then has a pH of 4.15 and an acidity of 55° D. By centrifuging this mixture, at an acceleration of 750 g. for 3 minutes, there is separated a curd and a new serum. There is obtained 480 g. of curd possessing the following characteristics:

| | Percent |
|---|---|
| Dry extract | 19.8 |
| Fatty materials | [1] 38 |
| Calcium content | [1] 0.54 |
| Lactose content | [1] 25 |

[1] With respect to the dry extract.

In addition, there is recovered 1.530 liters of a new serum having the following characteristics:

| | | |
|---|---|---|
| Dry extract | percent | 6.4 |
| Fatty materials | do | 0 |
| pH | | 4.10 |
| Acidity | °D | 55 |
| Calcium content | g./l | 1.14 |
| Lactose content | g./l | 51.5 |

THE PRESENT INVENTION

Thus, as set forth hereinbefore and in my copending patent application Ser. No. 619,272 dated Feb. 28, 1967, there is described a process for the manufacture of milk curd comprising the steps of acidifying whey derived from a previous curdling operation to a pH value outside the range in which fermentation takes place, and mixing the acidified whey with milk. The acidification of the whey may be effected chemically, for example by the addition of acids, or by physio-chemical methods, for example by electrodialysis.

The present invention seeks to provide improvements in the invention disclosed and claimed in said copending application, with a view to increasing the yield and to facilitating the carrying out of the process, whilst improving as much as possible the quality of the product obtained.

According to the invention, in a process for the manufacture of milk curd as set forth hereinbefore by mixing with previously acidified lactic whey, concentrated milk is used and the acidity of the whey, the pH value to which the milk is brought, the proportion of dry extract of the latter and the conditions of separation of the curd are determined in such a manner as to recover substantially as much of the whey as was used, to produce curdling of the milk.

Thus, the various parameters involved in the present method are the following:

(a) The degree of concentration of the milk represented by its dry extract percentage;

(b) The degree of acidity of the whey, indicated by its pH value;

(c) The pH value of the mixture of milk and acidified whey;

(d) The conditions under which the curd and the whey produced are separated, indicated by the dry extract percentage of the curd.

The process according to the invention results in a considerable increase in the yield of milk curd, which increase is all the more as the proportion of dry extract of the milk increases.

The concentration does not have any appreciable effect on the quality of the produce obtained. It results, however, in important advantages which show themselves, on the one hand, in a reduction in the quantity of acidified whey required to coagulate the milk and thus in a reduction in the volumes of liquid in circulation. On the other hand, by suitably choosing the various factors entering into consideration, namely the acidity of the whey, the pH to which the acidified milk is brought, the conditions of separation of the curd and the proportion of dry extract of the latter, it is possible to determine a proportion of dry extract of the milk for which the quantity of whey recovered after separation of the curd is equal to the quantity of acidified whey employed.

This equality is very important when carrying out the process continuously, since it suffices to acidify the recovered whey and to return it in contact with a quantity of milk equal to that from which it derives in order to suppress the constraints which cause excesses of whey.

By employing a whey acidified to pH 2 in order to acidify the milk to a pH of the order of 4.35 to 4.45, then by separating the curd from the whey by centrifuging, the proportion of dry extract for which equality is achieved between the volumes of whey employed and whey recovered is of the order of 25%.

Thus, in one aspect of this invention the process comprises acidifying whey to a pH of from about 0.5 to about 2.5, preferably from 0.9 to 2.0, still more preferably about 2, concentrating milk to a dry extract content of at least 20% by weight, adding said acidified whey to said concentrated milk until the pH of the mixture thereof is from about 3 to about 5, more preferably from about 4.35 to about 4.45 and then separating the curd from the whey by centrifuging.

The curd and whey produced are preferably separated by centrifugation until the dry extract percentage of the curd is about 15 to about 18 weight percent for skimmed milk and from about 19 to about 22 weight percent for whole milk in order to obtain the best results. This gives a dry extract percentage of about 22 to about 25 weight percent for the concentrated milk, either skimmed or whole milk.

The applicant has also found that the quality of the products obtained and the yield of the process can be improved by submitting the milk, before the application of the process, to a sterilization, which advantageously is combined with a homogenization when it is a question of whole milk.

The sterilization of the milk, before its coagulation by means of acidified whey, has for its result a coagulation of the casein into very fine particles. This gives a curd of a new type having a texture which is very smooth and a consistency similar to that of a jelly. Moreover, and this is very interesting, this curd does not exhibit any syneresis.

The decanting of the acidified milk is slower, but this can be easily remedied by increasing either the duration of the centrifuging, or the speed of this operation. On the other hand, the yield of curd is higher.

The homogenization permits the curd to be separated from the whey while avoiding migration of fatty globules outside the mass of curd.

The combination of the concentration with sterilization and, if necessary, homogenization gives surprising results, which exceed in interest the total of the results of the diverse operations taken separately.

In fact, whether it is a question of skimmed milk or of whole milk, the curd obtained, with excellent yields, offers a very smooth texture and a consistency of jelly which is more or less thick as the conditions of separation with the whey are more or less continued. This curd does not exhibit any syneresis even after several days of storage.

If the starting material is concentrated, homogenized and sterilized whole milk, it is observed that the curd obtained is capable of being beaten, for example by means of a beater or mixer of known type, to take up an aerated texture and a consistency similar to that of a foam. The increase in volume of this curd is on average from 30 to 40% after several minutes of beating.

This texture and this consistency are retained for several days at normal temperature (20° C.).

If the proportion of dry extract in the curd produced exceeds about 22%, no syneresis appears, even after several days rest at normal temperature.

The following non-limitative examples show the effect of the concentration of the milk on the yield of curd.

EXAMPLE 5

To skimmed milk concentrated to a dry extract content of 27.4% by weight there is added a whey acidified by electrodialysis to a pH value of 2, so as to give to the mixture a pH value of 4.40. For each liter of skimmed milk used, 3.870 liters of whey so acidified were added. Per liter of concentrated skimmed milk there is recovered 1340 g. of curd having a dry extract content of 15%, which corresponds to 465 g. of curd having a dry extract content of 15% per liter of non-concentrated skimmed milk having a dry extract content of 9.5%. The increase in yield compared with known processes employing rennet is of the order of 40%.

Centrifuging the above mixture at 2000 r.p.m. for one minute produced 1130 grams of curd having a dry extract content of 17.8%; 3.760 liters of whey being recovered. This corresponds to 1340 grams of curd with said dry extract content of 15% which can be obtained by shortening the centrifugation time; 3.550 liters of whey being recovered. Thus, in order to obtain equality of the quantities of acidified whey and recovered whey, the dry extract of the milk should have been chosen at about 25% for the curd at 17.8% and about 22% for the curd at 15%.

Without concentration, a liter of skimmed milk having a dry extract content of 9.5% mixed with 1.220 liters of whey acidified to a pH value of 2 would have given, under the same conditions of use as the process of said specification, 350 g. of curd having a dry extract content of 15% with 1.900 liters of recovered whey.

The following examples illustrate the influence of sterilization of the milk and, if necessary, of the homogenization on the application of the process described in said specification.

EXAMPLE 6

The starting material is skimmed milk having a dry extract content of 9.5%, which has been sterilized in an autoclave at 120° C. during a time of from 5 to 20 minutes.

To each liter of this milk is added 1.220 liters of whey coming from a previous curdling operation and previously acidified to a pH value of 2 by electrodialysis. The whey is added in a quantity such that the pH value of the mixture is 4.4.

The curd is separated by centrifuging at normal temperature.

There is obtained per liter of milk, 370 g. of curd having a dry extract content of 15%; 1.880 liters of whey being recovered. This represents an increase in yield of 15% compared with the known processes employing rennet.

As has been indicated in Example 5, skimmed milk having a dry extract content of 9.5% but not sterilized gives per liter, 350 g. of curd having a dry extract content of 15%.

The influence of sterilization on the amount of product obtained is not very important but the quality of the curd is better, the said curd having a creamy aspect.

EXAMPLE 7

The process is as described in Example 5, but starting this time with homogenized whole milk having a dry extract content of 12.5%, the fatty globules of which have a size less than 1 micron, and sterilized at 120° C. during 5 to 20 minutes.

There is obtained, per liter of milk, 480 g. of curd having a dry extract content of 19%. This curd is homogeneous and of fine structure.

This represents an increase in yield of 35 to 50% compared with known processes.

Whole milk having a dry extract content of 12.5%, but neither homogenized nor sterilized, gives per liter, 450 g. of coarser curd having a dry extract content of 19% after reincorporation, by heating, of the fatty material which had migrated in the whey.

For one liter of homogenized whole milk at 12.5%, 1.170 liters of acidified whey were used and 1.710 liters of whey were recovered. With non-homogenized whole milk, 1.150 liters of acidified whey were used and 1.720 liters of whey were recovered.

The following examples illustrate the combined application of concentration, sterilization, and if necessary, homogenization.

EXAMPLE 8

Proceeding as described in the foregoing examples, 1 liter of skimmed milk concentrated to a dry extract content of 29.5% and sterilized gives 1510 g. of curd having a dry extract content of 15%.

This corresponds to 485 g. of curd having a dry extract content of 15% for 1 liter of skimmed milk having the usual proportion of 9.5% dry extract.

The increase of yield is about 50% compared with known processes.

The yield is greater than that given by simple concentration (Example 5) or by simple sterilization (Example 6).

To each liter of sterilized skimmed milk concentrated at 29.5%, 3.650 liters of whey acidified at pH 2 were added. 1320 g. of curd at 17.2% were recovered together with 3.350 liters of whey. The curd has also a creamy aspect. This corresponds to 1510 g. of curd at 15% and 3.160 liters of whey.

EXAMPLE 9

Proceeding in the same way but starting with 1 liter of whole milk concentrated to a dry extract content of 28% and homogenized and sterilized, 1350 g. of curd having a dry extract content of 19% is obtained. (2.510 liters of whey were added and 2.180 liters of whey were recovered.) This corresponds to 600 g. of curd having a dry extract content of 19% per liter of whole milk having the usual proportion of 12.5% dry extract.

The improvement compared with Example 7 is very apparent.

The following examples illustrate the influence of concentration on the liquid volumes employed in carrying out the process.

EXAMPLE 10

One liter of while milk having a dry extract content of 12.8%, homogenized and sterilized, is acidified to a pH value of 4.15 with 1.760 liters of a whey, the pH value of which has been brought to 2 by electrodialysis.

By centrifuging the mixture at 3000 r.p.m. for six minutes, 665 g. of curd having a dry extract content of 17.3% and 2.100 liters of whey are separated.

EXAMPLE 11

One liter of the same while homogenized and sterilized milk, but concentrated to a dry extract content of 24.9% is acidified, to a pH value of 4.15, by means of 2.600 liters of the same whey at a pH value of 2.

The centrifuging of the mixture at 3000 r.p.m. for 6 minutes gives 1080 g. of curd having a dry extract content of 20.8% and 2.520 liters of whey.

The initial and final quantities of whey are substantially the same.

Comparison with Example 10 shows that, on the one hand the curd obtained is more concentrated and that, on the other hand, it uses less acidified whey in order to obtain the same quantity of curd (about 25% less).

What is claimed is:

1. A process for the continuous manufacture of cheese curd comprising:
   (1) sterilizing whole milk by heating,
   (2) concentrating said sterilized, whole milk to a dry extract content of from about 22 to about 25% by weight,
   (3) acidifying whey by electrodialysis to a pH of from about 0.5 to about 2.5,
   (4) adding said acidified whey to said concentrated, sterilized, whole milk until the pH thereof is from about 3 to about 5 in order to coagulate said milk thereby producing a mixture of curd and whey,
   (5) passing the thus produced curd and whey mixture to a centrifuge for separation,
   (6) centrifuging the curd and whey mixture until the dry extract percentage of the cheese curd separated therefrom is from about 19 to about 22% by weight and recovering the quantity of the remaining liquids which are substantially equal to the quantity of acidified whey used in step (3), and
   (7) recycling said remaining liquids to step (3) as the whey of step (3).

2. A process according to claim 1 wherein said whey is acidified to a pH of about 2, said acidified whey is added to said concentrated milk until the pH of the mixture thereof is from about 4.35 to about 4.45.

3. A process according to claim 1 wherein said milk is homogenized milk.

4. A process according to claim 1 wherein after separation of the curd, the latter is subjected to beating until it has a structure similar to that of a foam.

5. A process according to claim 4 wherein said beating is continued until the apparent volume of said curd has increased from 30 to 40%.

6. A process for the continuous manufacture of cheese curd comprising:
   (1) sterilizing skimmed milk by heating,
   (2) concentrating said sterilized, skimmed milk to a dry extract content of from about 22 to about 25% by weight,
   (3) acidifying whey by electrodialysis to a pH of from about 0.5 to about 2.5,
   (4) adding said acidified whey to said concentrated, sterilized, skimmed milk until the pH thereof is from about 3 to about 5 in order to coagulate said milk thereby producing a mixture of curd and whey,
   (5) passing the thus produced curd and whey mixture to a centrifuge for separation,
   (6) centrifuging the curd and whey mixture until the dry extract percentage of the cheese curd separated therefrom is from about 15 to about 18% by weight and recovering the quantity of the remaining liquids which are substantially equal to the quantity of acidified whey used in step (3), and
   (7) recycling said remaining liquids to step (3) as the whey of step (3).

7. A process according to claim 6 wherein said whey is acidified to a pH of about 2, said acidified whey is added to said concentrated milk until the pH of the mixture thereof is from about 4.35 to about 4.45.

8. A process according to claim 6 wherein after separation of the curd, the latter is subjected to beating until it has a structure similar to that of a foam.

9. A process according to claim 8, wherein said beating is continued until the apparent volume of said curd has increased from 30 to 40%.

References Cited

UNITED STATES PATENTS

| | | | |
|---|---|---|---|
| 3,528,821 | 9/1970 | Stenne | 99—116 |
| 3,423,208 | 1/1969 | Kuipers | 99—20 |
| 3,431,115 | 3/1969 | Biasi et al. | 99—116 |
| 2,963,370 | 12/1960 | Roundy | 99—116 |
| 3,316,098 | 4/1967 | Noznick et al. | 99—116 |

FOREIGN PATENTS

| | | | |
|---|---|---|---|
| 999,150 | 7/1965 | Great Britain | 99—115 |

OTHER REFERENCES

Davis, J. G.: Cheese, American Elsevier Publ. Co. Inc., New York, vol. I, 1965 (pp. 149–151).

RAYMOND N. JONES, Primary Examiner

D. M. NAFF, Assistant Examiner

U.S. Cl. X.R.

204—180 P

UNITED STATES PATENT OFFICE
CERTIFICATE OF CORRECTION

Patent No. 3,698,918  Dated October 17, 1972

Inventor(s) MARIE PIERRE GOUJARD

It is certified that error appears in the above-identified patent and that said Letters Patent are hereby corrected as shown below:

Column 1, line 9, insert the following:

-- France        62,912        May 25, 1966
   France        53,707        Mar. 16, 1966
   France       142,242        Mar.  4, 1968 -- .

Signed and sealed this 6th day of August 1974.

(SEAL)
Attest:

McCOY M. GIBSON, JR.　　　　　　　C. MARSHALL DANN
Attesting Officer　　　　　　　　　Commissioner of Patents